United States Patent [19]

Hauk

[11] 3,921,437

[45] Nov. 25, 1975

[54] APPARATUS AND METHOD FOR LEAK TESTING OF TOOL JOINTS BETWEEN DRILL PIPE SECTIONS

[76] Inventor: Ernest D. Hauk, 1315 E. 23rd St., Signal Hill, Calif. 90806

[22] Filed: Mar. 29, 1974

[21] Appl. No.: 456,161

[52] U.S. Cl. ................................. 73/40.5 R; 73/46
[51] Int. Cl.² ......................................... G01M 3/28
[58] Field of Search......... 73/46, 40.5 R, 49.1, 49.6, 73/49.8; 138/99; 277/101, 102, 116, 116.2

[56] References Cited
UNITED STATES PATENTS

| | | | |
|---|---|---|---|
| 2,817,230 | 12/1957 | McCully | 73/46 |
| 3,358,766 | 12/1967 | Current | 277/116.2 X |
| 3,371,521 | 3/1968 | Hauk | 73/46 |

Primary Examiner—Ruehl, Charles A.
Attorney, Agent, or Firm—Gausewitz, Carr & Rothenberg

[57] ABSTRACT

High pressure leak test apparatus for tool joints (couplings) between drill pipe sections comprises a longitudinally hinged, split casing containing a split, hollow cylindrical packer. Both casing and packer are adapted to open for laterally receiving a tool joint to be leak tested. Inner rings adjacent ends of the packer are provided with annular teeth adapted for gripping the tool joint to prevent axial extrusion of the packer and to prevent relative axial motion between the apparatus and the tool joint. Preloaded outer rings adjacent to the inner rings force the teeth of the inner rings into gripping contact with the tool joint. A relatively short packer has a pressure annulus to which pressurized fluid is applied, of a length to contain a central connection of the tool joint, but not the entire tool joint. A corresponding method for leak testing drill pipe tool joints is also provided.

7 Claims, 8 Drawing Figures

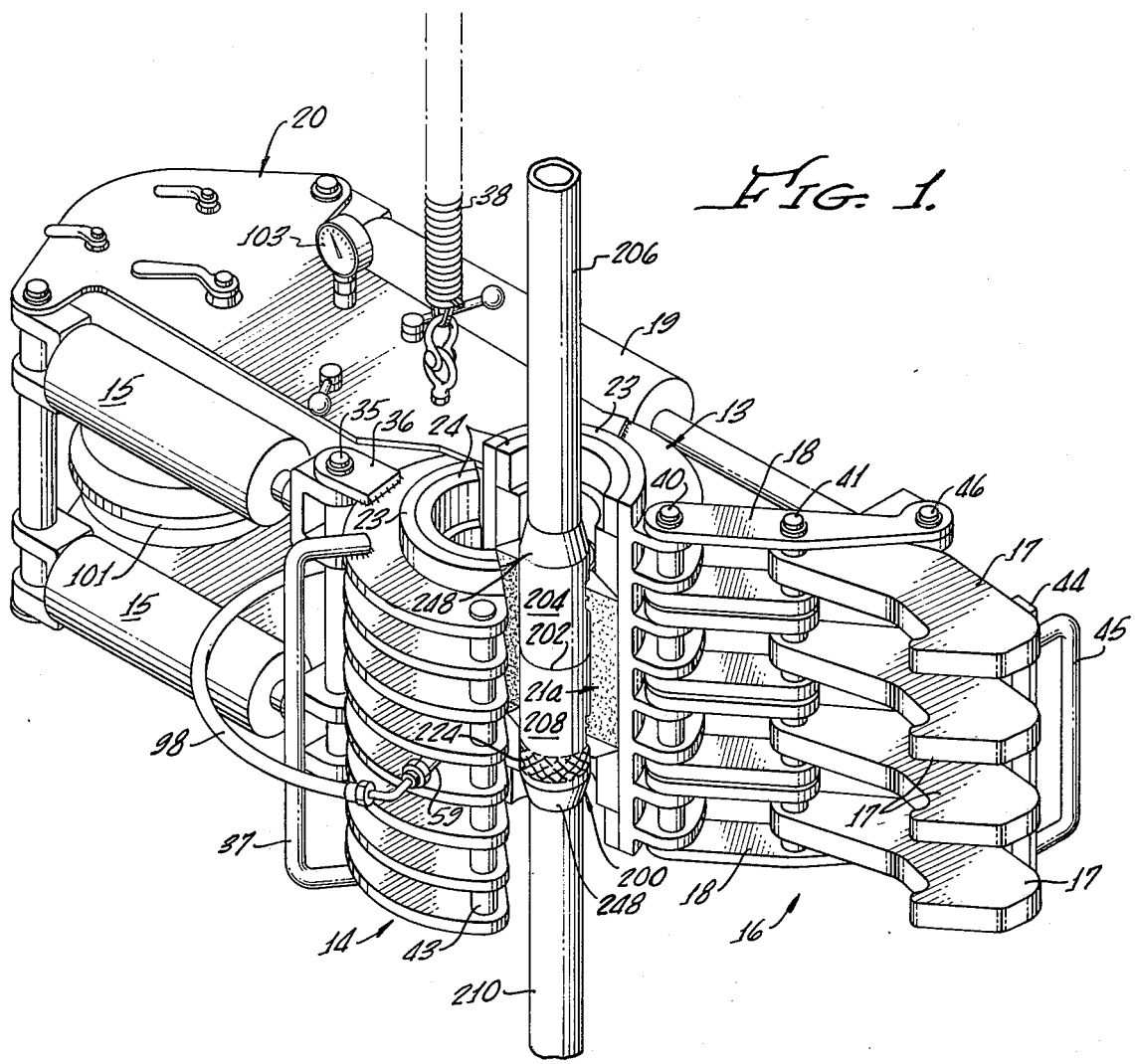
FIG. 1.
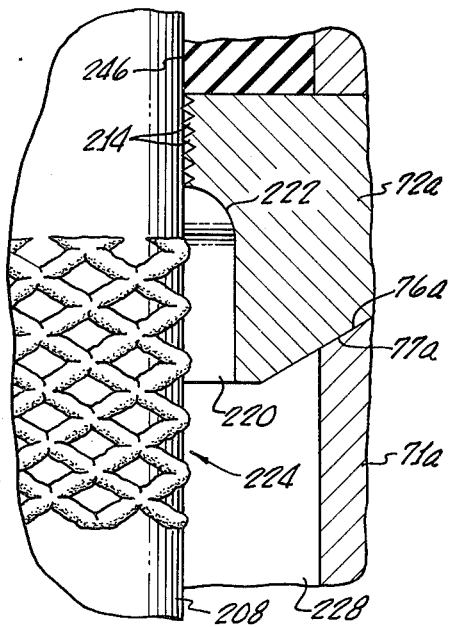
FIG. 5.
FIG. 5a.

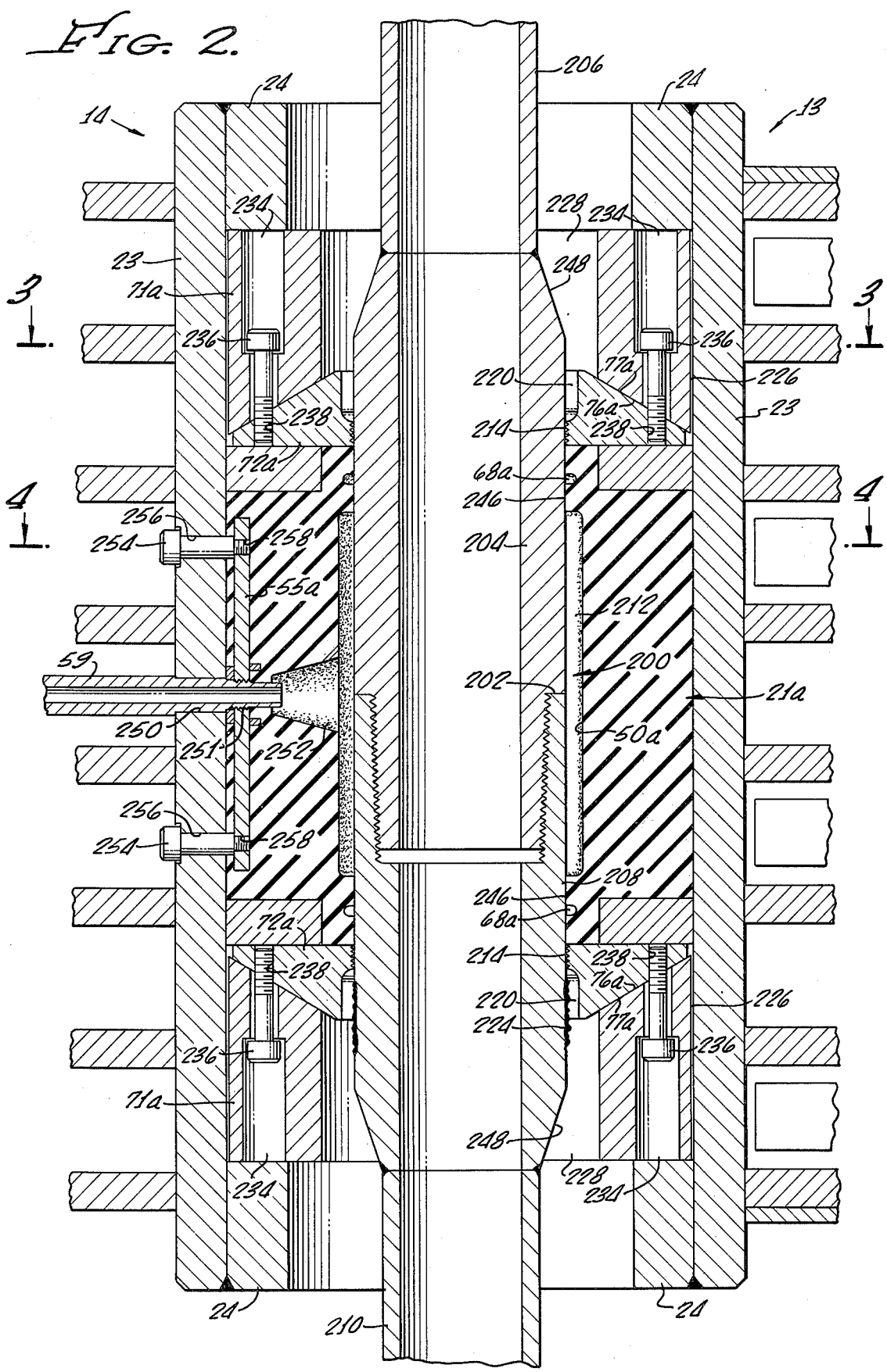

APPARATUS AND METHOD FOR LEAK TESTING OF TOOL JOINTS BETWEEN DRILL PIPE SECTIONS

BACKGROUND OF THE INVENTION

1. Field of the Invention

The present invention relates to apparatus and methods adapted to test for leaks in tool joints between drill pipe sections.

2. Description of the Prior Art

The present invention is an improvement upon the apparatus disclosed in the prior U.S. Pat. No. 3,371,521, for a Leak Testing Apparatus for Either Flush or Shouldered Pipe Joints and Packer Therefor, issued Mar. 5, 1968.

As described in such U.S. Pat. No. 3,371,521, a leak testing apparatus and packer for testing pipe (including tubing) joints forms a relatively compact, self-contained unit which may be suspended in adjustable relationship above the wellhead of an oil, or other type, well. The tester is adapted to leak test connections or joints between adjacent pipe sections as the pipe sections are lowered into (or raised from) the well. The leak testing, which employs an external hydrostatic force, is quickly and effectively performed without necessity for any relative longitudinal motion between the pipe and the tester, and without necessity for feeding the pipe longitudinally through any portion of the tester.

The apparatus embodies a generally hollow cylindrical housing or casing formed by a pair of laterally separable jaws which are longitudinally hinged together, and which internally confine a longitudinally split, hollow, molded elastomeric element referred to as a packer.

In order to leak test a pipe coupling, the jaws of the casing are opened by pneumatic actuators, thereby also opening the internally contained packer. The tester is next moved laterally to position the pipe coupling to be tested within a pressure annulus in the packer. After closing and locking the jaws, a pressurized liquid is introduced (through a fitting in the casing and the packer) into the region defined by the pressure annulus and the pipe coupling and adjacent attached portions of pipe. When the pressure annulus is fully pressurized, the pressure confined therein is monitored on a pressure gauge, a leak in the coupling being evidenced by a decrease in pressure as the pressurized fluid leaks through the joint to the inside of the pipe.

To quickly and efficiently test for small leaks, pressures of several thousand psi—up to 10,000 psi or more—are caused to be present in the pressure annulus. Under such large pressures the packer transmits great radial and axial forces to the casing, requiring the casing to be structurally very strong. Therefore, although the apparatus (considering its function) is comparatively compact, it still necessarily weighs a large number of pounds.

Due to fabrication costs and other factors, and because the leak testers must often be air transported between wellheads in order to be available when and where required, the size and weight of the apparatus must be minimized, consistent with its ability to perform its function properly and safely.

Accordingly, casings and packers of the leak testing apparatus have generally been made of an axial length only sufficient for the commonly performed leak testing of couplings between pipe or tubing used for well casing or delivery lines. Although such pipe and tubing comes in various diameters, the couplings between pipe sections are comparatively short, comprising a single cylindrical union into which adjacent ends of the pipe or tubing sections are threaded. As there are two possible leakage regions, one at each end of the coupling, it is necessary to enclose the entire coupling within the packer during leak testing. Because of the short lengths of these couplings, the casing and packers could be made correspondingly short.

It has long been desired to employ these leak testers for testing drill pipe couplings, or tool joints as they are generally called. Such leak testing is frequently found necessary to prevent loss of pressurized drilling mud injected through the drill pipe to the drill bit, or to assure accurate testing of a particular earth stratum for petroleum products. The latter is accomplished by sealing off a stratum (with the drill pipe in place) and then introducing a pressurized gas therein. As the pressurized gas is substantially withdrawn and tested for the presence of petroleum products, it is necessary to prevent unwanted contamination or loss of the test gas through tool joint leaks.

Available (that is to say, previously manufactured) apparatus for leak testing casing and delivery line pipe and tubing couplings, however, are not directly suitable for leak testing drill pipe tool joints, because the tool joints are considerably longer than the above-mentioned couplings and will not fit entirely within the packer. The tool joints also have other characteristics which prevent leak testing of even a portion of the coupling in the existing packers.

Drill pipe sections, unlike sections of well casing or delivery lines, are frequently taken apart and reassembled, for example, for removing the drill pipe from the well to repair or replace a drill bit (after which the drill pipe is put back into the well), or for removing the drill pipe from the well after the drilling has been completed (the drill pipe being then used for another well). To prevent damage to, and wear of, the ends of the pipe sections due to this repeated disassembly and assembly and the rough handling associated therewith, each end of a drill pipe section (which is 20 to 30 feet long) has a replaceable end fitting welded or threaded thereto. Each fitting forms one-half of the tool joint between two drill pipe sections, and is such that adjacent fittings may be threaded together to join the pipe sections. There results a comparatively long coupling having a possible leakage region between the fittings.

As stated above, the entire tool joint is too long to be completely enclosed within available packers and casings. Not only are the available packers too short to receive the entire tool joint, but the available casings are too short to allow installation of packers which would be long enough to receive the entire tool joint.

It is generally sufficient to leak test only the joint between the drill pipe fittings, as it is the exposed threaded ends of the end fittings which become worn and damaged through repeated assembly of the drill pipe sections and hence become prone to leak. Nevertheless, available packers and associated extrusion prevention rings are also unsuitable for leak testing only this small region of the tool joint.

One reason is that a tool joint, because of its shape, does not provide a suitable sealing and seating surface for the axial end of available packers or for the existing extrusion prevention rings which are now employed to prevent extrusion of packer rubber. The inner surface of an inner ring must seat closely and securely against the pipe adjacent a coupling or against a coupling itself to prevent axial extrusion of the pressurized packer rubber between the ring and pipe or coupling. The pipe ends of the tool joint fittings are generally beveled, for varying distances, in regions where the existing packers and the inner rings would seat. These same regions may also have rough welds where the fitting is attached to the pipe. Neither these bevels nor the weld areas provide suitable seating or sealing surfaces for the available packers and inner rings.

In addition, a region of the outer surface of at least the lower of the two fittings comprising a tool joint is surface hardened, for example by application of weld beads, for several inches near the pipe end to reduce wear from abrasion during drilling. The surface of the tool joint in this region is extremely rough and hence also does not provide a suitable sealing or seating surface for available packers and inner rings.

Even more importantly, however, available extrusion prevention rings provide insubstantial and inadequate resistance to axial movement of the tester relative to the tool joint during testing. Due to unequal abrasive wear of the fittings (which are of larger diameter than the drill pipe), and also due to the fact that random ones of drill pipe sections are coupled together upon reassembly, it is common to find that each of a pair of connected fittings has a slightly different outside diameter. Assuming only an eighth of an inch difference in diameters of adjacent fittings having an outside diameter of four inches (a common difference and diameter), there results approximately one square inch difference in cross-sectional area between the two fittings. When a 10,000 psi leak test pressure is applied to the tool joint, a 10,000 pound unbalanced axial force is applied to the tester. This force causes the tester to move axially relative to the drill pipe unless the tester is securely restrained or locked to the pipe or tool joint.

Heretofore the only restraint against axial movement of the tester has been provided by friction between the smooth inner surface of the inner extrusion prevention rings and the pipe whose coupling was being tested. This friction has been sufficient to prevent axial movement of the tester when testing casing or delivery line pipe or tubing because there is no appreciable differential cross section creating an unbalanced axial force on the tester. However, this small amount of friction is insufficient to prevent axial movement of the tester when tool joints are tested (assuming availability of a packer suitable for leak testing a joint between drill pipe end fittings).

For these reasons, the available packer and extrusion prevention rings used for testing couplings between casing and delivery line pipe and tubing sections are unsuitable for leak testing drill pipe tool joints.

Furthermore, increasing the length of a casing and packer to enable an entire tool joint to be enclosed within the packer and casing is undesirable as a much larger, heavier and more expensive tester would be required. Such a tester would also be more difficult to handle and expensive to transport between wellheads and would, because of its size and weight, be unsuitable for leak testing couplings between casing and delivery line pipe and tubing sections.

BRIEF DESCRIPTION OF THE DRAWINGS

FIG. 1 is an isometric view of the casing and packer opened to receive a pipe coupling;

FIG. 2 is a vertical sectional view showing the improved packer positioned for testing a tool joint;

FIG. 5 is a partial sectional view showing the improved inner ring gripping the tool joint;

FIG. 5a is a fragmentary perspective view showing the gripping teeth of the inner ring;

SUMMARY OF THE INVENTION

Figure 3:
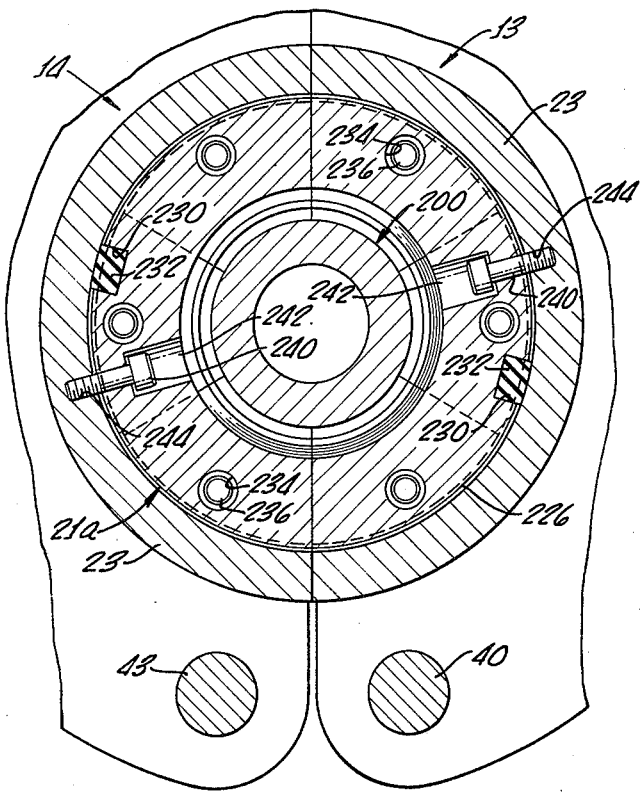
FIG. 3 is a sectional view along line 3—3 of FIG. 2 showing installation of the improved outer ring.

In carrying out the principles of the present invention according to a preferred embodiment, a rigid casing has hinged jaws adapted to be shifted between a closed condition wherein longitudinal mating surfaces are in mutual proximity and an open condition wherein the mating surfaces are mutually displaced so as to permit the casing to be shifted laterally to enclose a drill pipe tool joint. A short elastomeric packer, disposed within the casing, is longitudinally split to permit the packer to open with the casing for lateral reception of the tool joint. A short pressure annulus, internal to the packer, has a length sufficient to contain the central joint between the two fittings comprising the tool joint, the ends of the packer bearing against the tool joint but not the entire tool joint for sealing therewith. Means are provided for pressurizing the pressure annulus when the tool joint is in position for leak testing. Segmented inner rings adjacent the axial ends of the packer have projections on the inner regions thereof for tightly gripping of the tool joint to prevent relative motion between the casing and the tool joint and to prevent axial extrusion of packer material. Outer rings adjacent the inner rings are preloaded to force the projections of the inner rings into initial gripping contact with the tool joint when the casing is closed thereabout.

An inset or relief region is provided on the inner diameter of the inner rings, adjacent the projections, to provide clearance for rough, surface hardened regions of the tool joint. Elastomeric elements, confined between the outer rings and the casing, force the outer rings inwardly when the casing is closed. Inclined sliding contact surfaces between the outer and inner rings cause corresponding inward movement of the inner rings with consequent very forceful gripping of the tool joint when the annulus is pressurized. As pressure in the pressure annulus increases, axially expanding the packer against the inner rings, the resultant axial forces on the rings cause radially inward movement of the inner rings, thereby causing enhanced gripping of the tool joint.

A corresponding method is provided for leak testing the central joint between fittings comprising a tool joint, the method including using a short packer, enclosing only a portion of the tool joint, and gripping effectively the tool joint.

DESCRIPTION OF THE PREFERRED EMBODIMENT

Portions of the structure of the above-cited prior U.S. Pat. No. 3,371,521, are employed in the present leak tester for drill pipe connections or tool joints. Such structure, when described or referred to herein, is given a reference number the same as that used in the prior patent. Improved or altered structure is identified herein by the previously used reference number, except that a suffix *a* is applied. Structure relative to which there is no correspondence in the prior patent is identified by reference numbers in the 200 series.

BRIEF SUMMARY OF THE STRUCTURE OF THE PRIOR PATENT

As seen in FIG. 1, the leak test apparatus comprises a casing or clamping jaw means, formed by a backup jaw 13 and a pivoted jaw 14, the latter being actuated by pneumatic cylinders 15. Latch means 16 are provided for clamping and latching or locking the casing when it is closed for leak testing. The latch means comprises a hook means 17 and cranks 18 operated by pneumatic cylinders 19 (only one of which is shown). Cylinders 15 and 19 are mounted upon a body or housing portion 20, to which backup jaw 13 is fixedly attached.

Each of the clamping jaws 13 and 14 comprises a casing member 23 which is approximately ½ of a hollow cylinder. A semi-annular internal collar 24 is securely affixed at the inner surface of each member 23 at the upper and lower ends thereof (see also FIG. 2). Members 23 are adapted to contain therein a molded elastomeric rubber, for example, packer having integrally molded therein mounting, compressive preloading, stretching and extrusion prevention elements. When the packer is installed and jaws 13 and 14 are in a closed position, members 23 provide radial backup support for the outside walls of the packer, and collars 24 provide axial support for outer and inner extrusion-prevention assemblies which are installed at axial ends of the packer.

Figure 4:
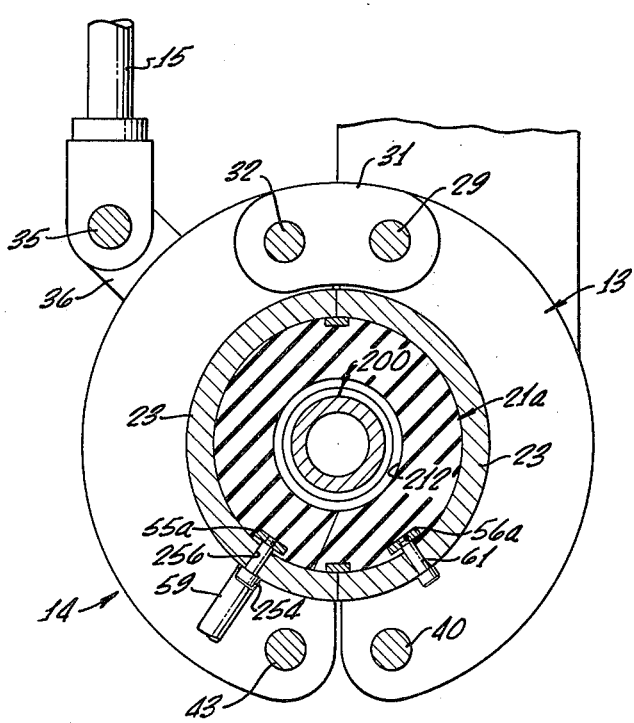
FIG. 4 is a sectional view along line 4—4 of FIG. 2 showing installation of the improved packer.

As illustrated in FIG. 4, jaws 13 and 14 are movably connected to each other by strong vertical pins or pintles 29 and 32, interconnected by a number of short links 31. A compound pivotal movement of jaws 13 and 14 is thereby provided which, upon shortening the actuator 15 (which is connected at its piston end to jaw 14 by a pin 35 passing through lugs 36), causes a wide separation or opening of jaws 13 and 14. The internally contained packer also opens, so that the pipe coupling to be leak tested may be laterally received.

A gripping handle 37 (FIG. 1) is welded to jaw 14, adjacent lugs 36, to facilitate manipulation of the apparatus by an operator. The leak test apparatus is freely suspended, as from a derrick, by a helical spring 38 which is attached at a lower end to housing portion 20. The apparatus may thereby be vertically and horizontally positioned manually to correspond to the location of the pipe coupling to be leak tested.

Pivotally mounted to jaw 13 by a pin 40 (FIG. 1) are cranks 18 which have their free ends pivotally connected to actuating cylinders 19 by a pin 46. The latching hooks 17 are pivoted to cranks 18 by a pin 41. Another gripping handle 45, also for manual manipulation of the apparatus, is welded to a bar 44 which is in turn welded to hooks 17.

OPERATION OF THE STRUCTURE OF THE PRIOR PATENT

Let it be assumed that the jaws 13 – 14 have closed upon a coupling to be tested, due to operation of cylinder 15. Then, with cylinders 19 in their extended position, the operator effects (by use of handle 45) clockwise (as viewed from above) pivoting of hooks 17 to a position adjacent a latch pin 43. Cylinders 19 are next pneumatically shortened to effect counterclockwise movement of cranks 18 about pin 40 and thereby draw hooks 17 into a tightening and locking condition relative to latch pin 43. This movement of hooks 17 first effects an additional closing or clamping movement of jaws 13 and 14 and then locks the jaws closed (pin 41 being in an over-center relation with respect to a plane intersecting the axes of pins 40 and 43), allowing the casing to constrain the packer under the leak test pressures to be applied.

Fluid pressure is then applied through a hose 98 which communicates, by way of a fitting 59, with the pressure annulus. The pressure within the pressure annulus is then monitored on a pressure gauge 103. A drop in pressure indicates a leak in the pipe coupling being tested.

After the leak test is completed, pressure in the pressure annulus is reduced, and cylinders 19 are extended to loosen hooks 17. Hooks 17 are then manually pivoted to unlocking positions, and cylinders 15 are used to open jaw 14. The apparatus is then moved laterally away from the tested coupling to a position awaiting testing of subsequent pipe couplings. There may be as many as 600 to 800 pipe couplings in a single string of pipe.

For description of additional structure and operation, reference is made to said U.S. Pat. No. 3,371,521, the disclosure of which is hereby incorporated by reference as though fully set forth herein.

As previously stated, the prior art packer used for leak testing couplings between casing and delivery line pipe and tubing is (in testers thus far manufactured) too short to enclose an entire drill pipe tool joint within its pressure annulus. Further, the internal axial length of the casing, comprising jaws 13 and 14, is (in testers thus far manufactured) too short to enclose any packer having a pressure annulus long enough to contain an entire tool joint (comprised of an upper and lower fitting on adjacent pipe sections). Conversely, a packer suitable for leak testing casing and delivery line couplings is too long to test only the joint between tool joint fittings, because end regions of the packer would bear against regions of the tool joint (for example, bevels, welds or rough, surface hardened regions) not affording good sealing.

GENERAL DESCRIPTION OF THE PRESENT IMPROVEMENT

To overcome the above described problems, and as best seen in FIG. 2, a pair of improved extrusion prevention and gripping rings 72a (which may be considered as a substitute or replacement for the rings 72) is provided. Such rings 72a have restraining means for (a) preventing relative movement between the tester and a long tool joint 200 being tested, and (b) enhancing the prevention of packer rubber extrusion. Rings 72a are termed inner rings, being positioned to grip constant diameter regions of the tool joint near a connection 202 between an upper fitting 204 (attached to a drill pipe section 206) and a lower fitting 208 (attached to a drill pipe section 210).

Because inner rings 72a seat directly against the tool joint, instead of against the pipe sections 206-210 outside of the tool joint, an improved shorter packer 21a is provided which has a pressure annulus 212 adapted for enclosing only a short region of the tool joint adjacent connection 202 and not the entire tool joint. The length of packer 21a (which may be considered a substitute or replacement for the packer 21) is such as to fit between inner rings 72a when they are located in optimum gripping positions relative to the tool joint.

Improved longer outer rings 71a (which may be considered substitutes or replacements for the rings 71) are provided adjacent each inner ring (on the side away from the packer 21a) to axially position the inner rings 72a tightly against the ends of the packer and thus prevent axial extrusion of the packer during leak testing. Furthermore, the outer rings 71a perform important functions relative to the gripping of the tool joint. Outer rings 71a are provided with preloading means for forcing the inner rings 72a into gripping contact with the tool joint when the tester is closed.

DESCRIPTION OF THE IMPROVED EXTRUSION PREVENTION AND GRIPPING MEANS

As seen in FIG. 2, improved extrusion prevention and gripping means (comprising outer rings 71a and inner rings 72a) are provided at the ends of packer 21a, between the packer and collars 24 of the casing.

Figure 6:
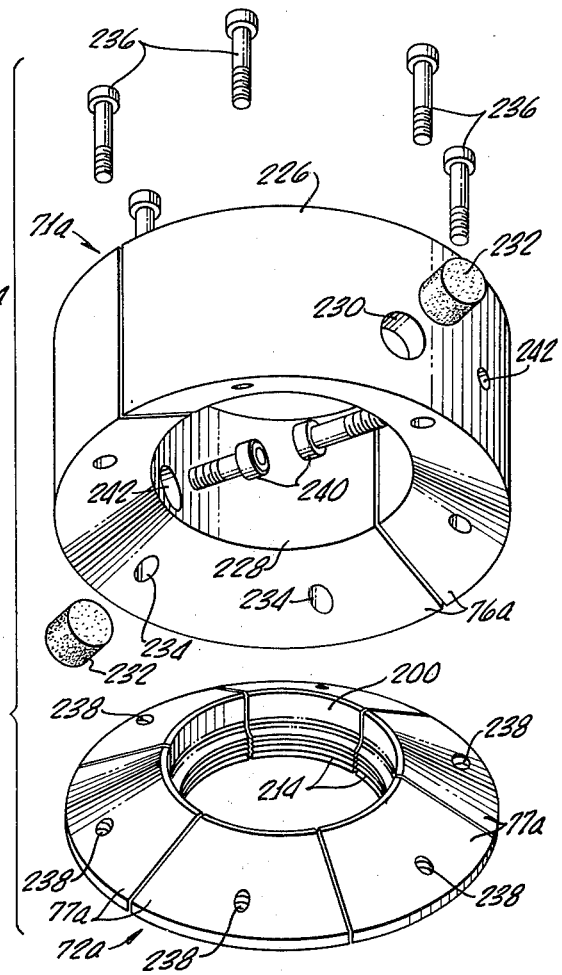
FIG. 6 is an exploded isometric view of the improved inner and outer rings.

Each inner ring 72a, FIGS. 5, 5a and 6, is provided with one or more sharp annular projections or teeth 214 on an inner surface. The teeth, preferably several, as best seen in FIGS. 5 and 5a, are preferably axially symmetrical, that is, a root or base 216 between the teeth is midway between the adjacent teeth. As a consequence, teeth 214, when forced into gripping contact with tool joint 200 (in a manner described below), cut or dig into the tool joint to provide restraint against axial movement of the tester relative to the tool joint in either direction, such as might otherwise result from asymmetrical axial forces on the jaws 13 and 14 caused by different diameters of different portions of the tool joint 200 enclosed in the annulus 212. The scope of the invention, however, includes the use of non-symmetrical or inclined teeth such as may provide greater restraint against axial movement of the tester in one direction than the other.

Inner ring 72a is provided with a larger diameter inner surface inset region 220, adjacent teeth 214, which is radiused in a region 222 into the smaller inner diameter region of the teeth. Region 220 extends the remaining length of the inner diameter to an outer surface 77a, and provides clearance for the rough weld beads of a surface hardened region 224 of drill pipe fitting 208 (FIG. 5) to assure proper seating of the teeth 214 against the tool joint 200.

It is emphasized that the tool joints may be worn, scored, etc., and that gripping and sealing thereagainst may therefore be difficult to achieve.

Each inner ring 72a (FIG. 6) divided into six equal segments and has an outer surface 77a that is frustoconical. Surface 77a, in cooperation with a similarly shaped inner surface 76a on outer ring 72a, causes the inner ring to move radially inwardly when the rings are subject to an axially compressive force. Such movement results because the mating frustoconical surfaces are convergent in an axial direction away from the packer, e.g., upwardly in the case of the upper set of rings. As a consequence, when the pressure annulus of packer 21a is pressurized, the resultant axial loads force the inner rings 71a radially inwardly and teeth 214 are forced into the tool joint 200.

Sufficient gaps are provided between the ring segments to allow the necessary radially inward movement of the segments. The surface 77a of each inner ring terminates adjacent the larger diameter region 220, and no segments have projecting horizontal lips (like lips 86 of the prior art 72). Fabrication of the inner rings is thereby simplified.

Outer rings 71a and inner rings 72a occupy that portion of the inner length of the casing between the ends of packer 21a and the collars 24. The outer surface 226 of the outer ring (FIG. 2) has substantially the same diameter as the inner diameter of members 23. The diameter of an inner surface 228 (FIG. 5) is smaller than or approximately equal to the diameter of region 220 of inner ring 72a. The outer ring 71a is divided into two segments along a diameter so that it may open with jaws 13 and 14.

Outer surface 226 of outer ring 71a is provided with opposing cylindrical recesses 230 (preferably one in each segment) adapted for receiving therein a cylindrical elastomeric element 232 somewhat smaller in diameter than the recess and somewhat longer than the recesses are deep. The function of elements 232 is more particularly described below.

In the preferred embodiment, recesses 230 are axially located approximately 30° off center and at approximately one-third of the height of the outer ring, being nearer the end adjacent the inner ring. The recesses are approximately one inch in diameter and extend about one quarter of the way through the outer ring. Corresponding recesses may be provided within the inner surface of member 23 to contain the free ends of elements 232, the same being within the scope of the invention.

Six symmetrically spaced, oversized countersunk holes 234 are axially bored through each outer ring (FIGS. 2 and 6). Six bolts 236, passing through holes 234, are loosely threaded into holes 238, one in each segment of inner ring 72a, to assemble the inner and outer rings. The oversize holes 234 allow relative radial motion between the rings, as is necessary for the radially inward movement of the inner ring segments.

The assembled inner and outer rings 72a and 71a are installed internal to the casing, at each axial end of the packer 21a (in substantially the same manner that inner and outer rings 72 and 71 of the prior art are installed). A bolt 240 passes through a countersunk hole 242 in each half of the outer ring. The bolts are loosely threaded into holes 244 in members 23 (FIGS. 3 and 6).

The elements 232, as best seen in FIG. 3, are compressed when the casing is closed. This compression radially preloads the outer ring 71a, thereby forcing the two segments of the outer ring radially inwardly. This radial movement, because of the beveled interfaces between the inner and outer rings, in turn forces the inner ring radially inwardly. When a tool joint is installed within packer 21a and casing jaws 13 and 14 are closed, compressed elements 232 thus force the teeth 214 of the inner ring to grip or cut into the surface of the tool joint, while the pressure annulus 112 in the packer is pressurized. As the pressure annulus becomes fully pressurized, the ends of the packer exert a large axial compressive force on the rings (sandwiched between the packer and collars 24 of the casing). The axial force causes a further radially inward force of the inner ring, thereby forcing teeth 214 into greater gripping contact with the tool joint, to increase restraint against axial movement of the tester.

The improved extrusion prevention and gripping means, comprising inner and outer rings 72a and 71a, thus perform the critical dual functions of preventing axial extrusion of packer 21a under the large forces created by pressurizing the pressure annulus within the packer, and providing restraint against axial movement of the tester relative to the tool joint being tested.

DESCRIPTION OF THE IMPROVED PACKER

As best seen in FIG. 2, an improved short packer 21a has a short pressure annulus 212 of a length to contain only the connection 202 between upper fitting 204 and lower fitting 208 and a short region of the fittings to either side of such connection. That is, the annulus 212 is of sufficient length to enclose the entire tool joint 200. Inwardly projecting sealing regions 246 at axial ends of packer 21a, adjacent pressure annulus 212, seat against relatively smooth regions of fittings 204 and 208, well away from beveled regions 248 at the ends of the fittings and away from a surface hardened region 224 (on fitting 208). Although the former fitting regions are referred to as "relatively smooth", they may (as mentioned) be scored or worn.

The improved extrusion prevention and gripping means (comprising inner rings 72a and outer rings 71a) axially confine packer 21a within jaws 13 and 14. Two bolts 61, passing through holes in member 23 of jaw 13, are threaded into a bar 56a (internally molded within packer 21a) to secure packer 21a to member 23 of jaw 13 (FIG. 4).

The fitting 59, which serves a dual function of supplying pressure to the pressure annulus 212 and securing the packer 21a to member 23 of jaw 14, passes through a hole 250 in member 23 of jaw 14 and is threaded into a hole 251 in a retainer 55a (internally molded within packer 21a). Fitting 59 internally communicates with pressure annulus 212 at about the center of the annulus, through a radially inwardly diverging, or flared, aperture 252 in packer 21a. The flair of aperture 252 is sufficient to prevent the opening from being squeezed closed and preventing complete pressurization of the pressure annulus. Because there is otherwise only fitting 59 to secure packer 21a to member 23 of jaw 14, two bolts 254 pass through holes 256 in member 23 of jaw 14 and are threaded into holes 258 in bar 55a. Packer 21a is thereby secured to jaw 14.

An extremely important consequence of employing a short packer having a short pressure annulus adapted for enclosing only the central connection between tool joint coupling fittings, and not the entire tool joint 200, is that radial forces applied by the packer 21a to the casing (and thus to the locking means) are very much less than would be applied were a packer employed having a pressure annulus of a length sufficient to contain an entire tool joint (within a correspondingly longer casing). The force applied to the casing is substantially less than that applied by existing packers 21 used to leak test casing and delivery line pipe and tubing couplings. Although the ring tension in the casing is a function of the diameter of, and the pressure within, the packer, 21a the short pressure annulus 212 transmits this tension to only a short region of casing. There is thus a relatively low total force tending to open jaws 13 and 14. This smaller casing force permits more secure closure of the casing jaws, with consequent improved sealing against pressure leakage of the longitudinal split in the packer in the jaw opening region. This smaller force applied to the apparatus also reduces parts wear and increases apparatus life.

Another beneficial result of employing a short, and hence small volume, pressure annulus 212 is that a faster and more sensitive leak test is provided, a small leak in the tool joint 200 under test resulting in a comparatively rapid loss of pressure in the annulus. Also, a comparatively shorter time is required to pressurize the pressure annulus. In addition, it is unnecessary to bleed the air from the pressure annulus prior to pressurization with water because the volume of trapped air is so small as to be insignificant. Thus, only a single pressurizing line (line 98) and a single pressurizing fitting 59 is required. Use of a second fitting 59 and a pressure line 96, as used in the prior invention to bleed air from the pressure annulus prior to leak testing, is eliminated. This results in more rapid leak testing as it is unnecessary to fill the pressure annulus slowly with water to force out the air contained therein before pressurization.

A single annular groove 68a is provided within region 246 at axial ends of packer 21a, adjacent the pressure annulus, to additionally prevent axial extrusion of the packer and to additionally provide pressure sealing of the packer against the tool joint 200 during leak testing.

An inner wall 50a of pressure annulus 212 is cylindrical, without the several steps of the prior art packer 21. A straight cylindrical annulus wall is possible because the pressure annulus is adapted to contain only the relatively constant diameter central region of the tool joint 200. In contrast, the pressure annulus of the prior art packer 21 was adapted to enclose an entre coupling, including both the coupling and the smaller diameter adjacent regions of pipe threaded thereinto. To minimize the original annulus volume, a stepped inner wall was required, as would also be necessary were the entire length of the tool joint to be contained within a long pressure annulus. The constant diameter wall of the pressure annulus 212 of packer 21a makes the packer somewhat less difficult to fabricate. Packer 21a is otherwise similar to the prior art packer 21. It is of molded rubber (although it may be made of other elastomeric material) construction and is longitudinally split so that it may be laterally opened when the casing is opened.

OPERATION OF THE IMPROVED APPARATUS

Figure 7:
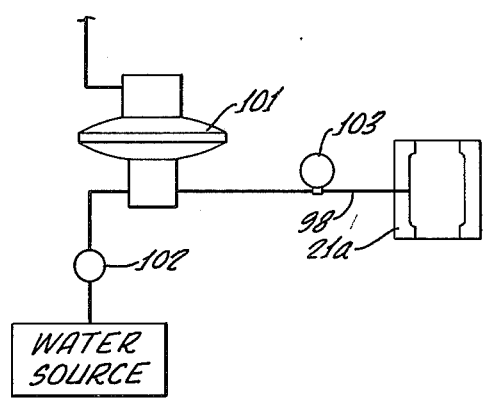
FIG. 7 is a schematic drawing of the modified pressurizing system.

Leak testing of the joint between tool joint fittings 204 and 208 is performed in substantially the same manner described above and as described in the prior patent, with the exception that a line 96 and a valve 97 (both in the prior patent) are not used to bleed the air from the pressure annulus 212 prior to pressurizing the annulus and to relieve pressure after the testing is completed. A pump 101 (FIGS. 1 and 7) is used to build up the water pressure to a very high value, for example 10,000 psi. Pressure in pressure annulus 212, before opening the casing, is relieved, for example, by opening valve 102 between the pressure annulus and the water source (FIG. 7).

The foregoing detailed description is to be clearly understood as given by way of illustration and example only, the spirit and scope of the invention being limited solely by the appended claims.

I claim:

1. A high pressure leak testing apparatus for tool joints, comprising:
   a. a rigid casing having hinged jaws adapted for shifting between a closed condition and an open condition permitting said casing to be shifted laterally to enclose the central connection between tool joint fittings,
   b. an elastomeric packer disposed within said casing, said packer having a pair of longitudinal mating surfaces that move with said casing jaws to an open condition for lateral reception and discharge of said tool joint fittings, said packer also having an internal pressure annulus for enclosing said central connection between said tool joint fittings, but not the entire tool joint,
   c. means for introducing pressurized fluid into said pressure annulus when said casing jaws and said packer are in a closed condition and said connection between tool joint fittings is enclosed in said packer, and
   d. means disposed between each axial end of said packer and the adjacent end of said casing for preventing axial extrusion of the ends of said packer and for preventing relative axial movement between said casing and said tool joint fittings, when said pressure annulus is pressurized,
   said means including cooperating inner and outer rings, said inner rings being segmented, said rings including means for forcing said inner rings radially inwardly in response to axial forces exerted on said rings by said packer when said pressure annulus is pressurized,
   at least one of said inner rings incorporating gripping means for tightly gripping the adjacent tool joint fitting to prevent relative axial motion between said casing and said tool fittings in response to asymmetrical axial forces on said casing caused by different diameters at different portions of said tool joint fittings,
   portions of the inner surface of said inner ring adjacent said gripping means being enlarged, said enlarged portions being adapted to provide clearance for rough regions of said enclosed tool joint fittings.

2. A leak test apparatus for leak testing drill pipe tool joints, comprising:
   a. a longitudinally split casing having generally semicylindrical jaws hinged along adjacent longitudinal edges for opening and closing,
   b. an elastomeric packer disposed within said casing, said packer being substantially shorter than the interior of said casing and having a short pressure annulus formed in an inner surface thereof,
   said pressure annulus being adapted to receive the central connection of a two piece drill pipe tool joint, and not the entire tool joint,
   said packer being longitudinally split and being opened when said casing is opened,
   c. means for introducing pressurized fluid into said pressure annulus, said means including a pressure line communicating through said packer with said pressure annulus,
   d. a segmented inner ring provided between each axial end of said packer and the adjacent end of said casing,
   each of said inner rings having tool joint contacting surfaces and plural sharp annular inwardly projecting elements thereon,
   said elements being adapted for tightly gripping portions of said received tool joint during leak testing of said central connection, and
   e. split outer rings provided adjacent said inner rings, said outer rings including loading elements, for compressing said outer rings when said casing is closed to thus cause said outer rings to be moved radially inwardly, said inner and outer rings having cooperating frustoconical surfaces such that said inward movement of said outer rings is transmitted to said inner rings, to cause said annular elements of said inner rings to tightly grip said tool joint being leak tested, and also such that axial expansion of said packer in response to pressurization thereof causes additional inward movement of said inner rings and consequent augmental gripping of said tool joint whereby said casing and said tool joint are maintained in fixed axial relationship against axial forces on said casing caused by different cross sectional areas of different portions of said tool joint enclosed in said annulus, inner regions of said inner rings being enlarged adjacent said annulus elements, said enlarged inner regions being adapted to provide clearance between said inner rings and irregular surface regions of said received tool joint.

3. A method of testing a coupling which interconnects adjacent sections of pipe, the outer diameters of said pipe sections being smaller than the outer diameter of said coupling, said coupling having a central connection therein, said method comprising:
   a. providing a longitudinally split casing having jaws and containing an elastomeric packer which is correspondingly longitudinally split, the length of said packer being less than that of the coupling to be tested,
   b. providing at each end of said packer and within said casing a toothed extrusion-prevention and gripping ring adapted to bite into said coupling in response to closing of said jaws and also in response to fluid-pressurization of said packer, and further adapted to prevent extrusion of packer material when the packer is fluid pressurized,
   c. closing said jaws and packer on said coupling to cause said toothed rings at opposite ends of said packer to bite into said coupling on opposite sides of the central connection in said coupling,
   d. pressurizing said packer with fluid to thereby cause additional biting of said rings into said coupling, and
   e. determining whether or not said fluid leaks inwardly from said packer through said central connection.

4. In an apparatus for high pressure leak testing of pipe and tubing couplings and comprising a rigid casing having longitudinally hinged jaws for shifting between open and closed positions to thereby receive said couplings, a longitudinally split elastomeric packer disposed within said jaws and opening and closing therewith and having an internal pressure annulus for receiving said couplings, pressure means for introducing pressurized fluid into said annulus, and packer extrusion prevention rings axially disposed between ends of said packer and adjacent ends of said casing, the improvement comprising means adapted for using said casing and said pressure means to leak test drill pipe tool joints which are axially longer than said packer and which may have different cross sectional areas in different regions due to wear, said means comprising:
 a. a replacement packer substantially shorter than said first mentioned packer and having a pressure annulus substantially shorter than said first mentioned pressure annulus, whereby the central connection of said tool joint, but not the entire tool joint, may be received therewithin for leak testing, ends of said replacement packer being adapted to close on portions of said tool joint and not on sections of pipe connected thereto, and
 b. replacement rings, said rings having internal tool joint gripping surfaces and gripping means disposed on said surfaces,
  said gripping means being adapted to be forced into tight gripping contact with said received tool joint in response to pressure applied to said annulus of said replacement packer, whereby said casing is maintained in fixed axial relationship with said received tool joint against axial forces on said casing caused by different cross sectional areas of different portions of a tool joint being leak tested.

5. The improvement of claim 4, wherein said gripping means comprises plural sharp annular projections.

6. The improvement of claim 4, wherein said replacement rings include preloading means for causing said gripping means to grip said received tool joint when said casing is closed thereabout.

7. The improvement of claim 4, wherein inner portions of said inner rings are substantially recessed adjacent to said gripping means, whereby to provide clearance for irregular surface portions of said received tool joint.

* * * * *